June 23, 1936. M. WAGNER 2,045,210
SPRINGING ARRANGEMENT FOR POWER DRIVEN VEHICLES
Filed Jan. 19, 1934
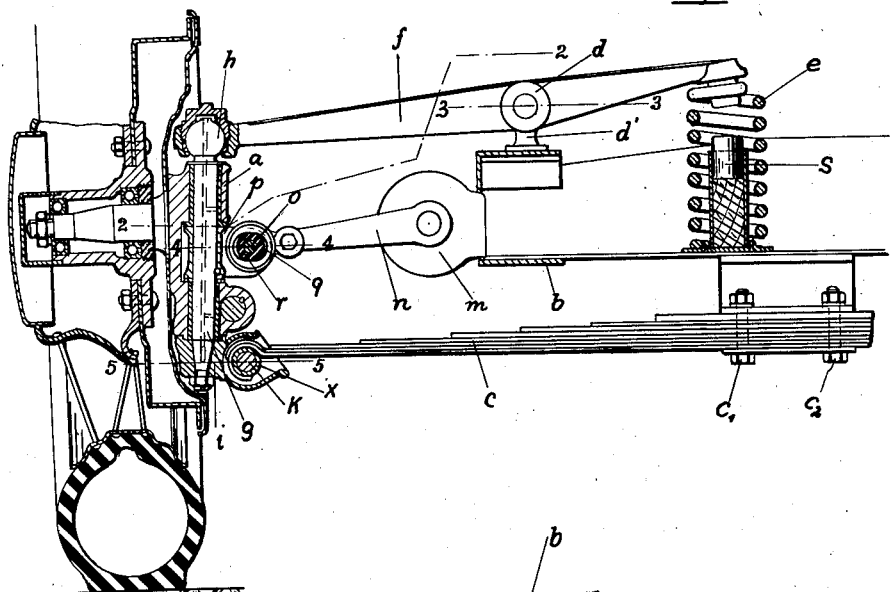
Inventor.
Max Wagner Patented June 23, 1936

2,045,210

UNITED STATES PATENT OFFICE 2,045,210

SPRINGING ARRANGEMENT FOR POWER-DRIVEN VEHICLES

Max Wagner, Stuttgart, Germany, assignor to Daimler Benz Aktiengesellschaft, Stuttgart-Untertürkheim, Germany, a company of Germany Application January 19, 1934, Serial No. 707,385
In Germany January 26, 1933

12 Claims. (Cl. 267—20)

This invention relates to a suspension of wheels by means of leaf springs and link members, more particularly for independently sprung wheels of power-driven vehicles, and consists especially in that the link member or members also are sprung with respect to the frame or chassis of the vehicle.

This method of suspension or springing has the advantage that the leaf spring is partly relieved from the springing forces which is especially important when the wheel is carried by a leaf spring, which, together with the link member, replaces the axle so that the leaf spring is comparatively strongly stressed also in the transverse direction.

A further advantage consists in this, that if the leaf spring should be broken the springing does not suddenly cease but is carried on by the link member springing for which purpose an elastic stop may preferably be provided which prevents the link springing being overloaded.

Preferably the leaf spring and link member springing are so arranged that they tend to twist the frame as little as possible.

The invention further relates to a particular advantageous guiding and springing of the wheels. The wheel is guided, more particularly, in a vertical transverse plane of the vehicle by means of two guiding elements, for example link members, in the manner of a jointed quadrilateral and is sprung by a substantially unguided helical spring which is subjected to compression and which bears, for example, against the link member.

Such unguided helical springs have the advantage of absence of friction and therefore very soft springing and require no attention or lubrication. Above all, they form the simplest and most reliable springing. In combination with two guiding elements guiding the wheel they give an extremely simple and in every way advantageous and economical arrangement of the springing.

In contradistinction to tension springs, the compression springs have the advantage of greater insensitivity and reliability since the spring forces, as distinct from those in tension springs, do not tend to loosen the springs from their supports but rather assist the compression between the tension and its support or the parts to be sprung.

The invention further relates to the additional link member which serves essentially in the case of breakage of a spring for maintaining the wheel guidance. According to the invention the additional link member is attached directly to the link journals by a link connection.

A further feature of the invention is the connection of the elements guiding the wheel, that is, in this case the link member and the leaf spring with the link journal in such a manner that the link member is connected with the link journal by a ball joint, while the leaf spring is jointed to the link journal in the usual manner by means of a transverse ball mounted, for example, outside the link journal axis, in such a manner that the link journal can yield somewhat by a swinging movement about the ball joint when the leaf spring yields laterally.

The invention has in addition to the advantage of great simplicity of pivoting the stub axle carrier, the advantage of a great security of the axle and springing construction and also the further advantage of a certain resilience of the wheel also in the direction of travel. This effect arises from the fact that each leaf spring has a certain resilience in the transverse direction so that the end of the leaf spring can perform a small swinging movement in this direction. If the link members were secured with the link journals in the same way as the leaf spring, for example by a ball, on account of the rigidness of the link member it would not be possible for the leaf spring to yield in the transverse direction thereto so that the shocks impinging on the wheel, for example in the direction of travel with transverse springs, would be transmitted undamped to the frame. The invention avoids such a rigid system since the link journal with the end of the transverse spring can swing somewhat about the ball joint, and thus improves the travelling qualities of the vehicle by simple means.

It has already been proposed to spring steering wheels by means of link members and leaf springs, the link member being connected by a ball joint and the leaf spring by means of the spring bolt arranged on a joint member with the axle carrier. In this arrangement, the ball joint was required because the link member was mounted not on a link journal but directly on the axle carrier and consequently the ball joint had to take up both the swinging movement of the wheel in a vertical plane and the deflections of the link member.

In the arrangement according to the invention on the other hand, such a consideration is not necessary because the deflection of the link member is taken into account by using a link journal. The arrangement of the ball joint therefore has an essentially different purpose as has been pointed out above.

The different ways of connecting the link member and leaf spring with the stub axle carrier are further desirable in as much as the ball joint which is unsuitable for leaf springs is avoided while such a connection is possible and suitable for the link member.

Fig. 1 is an elevation of the means for connecting the stub axle carrier with the frame.

Fig. 2 is a plan view, partly a section of the same on line 1—1 of Fig. 1.

Figs. 3, 4 and 5 are respectively sections on lines 3—3, 4—4, 5—5 of Figs. 1 and 2, several parts being omitted for sake of clearness.

The stub axle carrier $a$ is suspended on the frame by a lever $f$ mounted at $d\ d_1$ on the frame and by a leaf spring $c$ secured to the frame $b$ at $c_1$ and $c_2$ on both sides of the central longitudinal plane of the vehicle. In the fork-like stub axle carrier $a$ the link journal $g$ is mounted, the upper end of which forms a ball $h$ for the joint which connects the link journal with the link member, while on the lower end of the journal a joint piece $i$ is securely keyed in which in a suitable manner outside the link journal axis a transverse bolt $k$ is mounted with a bushing $x$ for connecting the link journal or the joint piece with the leaf spring $c$ (Fig. 5). A further additional link member $n$ is secured to the link journal by means of a second fork piece $p$ arranged between the forks of the stub axle carrier and mounted rigidly or rotatably on the link journal, whereby in the joint $o$ connecting the fork piece with the additional link member a certain amount of play $q$ in the longitudinal and transverse direction and also a rubber buffer $r$ may be provided so that the movement of the stub axle carrier which is guided by the leaf spring $c$ and the link member $f$ is not hindered by the additional link member $n$. The latter also actuates the shock absorbers $m$ (Fig. 4).

The link member $f$ is extended towards the middle of the vehicle beyond the joint point $d$ and is supported with respect to the frame by a helical spring $e$. The movement of the link member or the spring $e$ is limited by a preferably elastic stop $s$ arranged in the interior of the spring.

When the vehicle or the wheel yields relatively to the frame the spring work is distributed between the leaf spring and the helical spring $e$ so that the leaf spring, which is subjected to transverse and torsional stresses at the same time, is partly relieved.

The arrangement of the leaf spring is near as possible to the longitudinal central plane of the vehicle has the advantage that the frame is subjected to a smaller twisting stress which becomes less the nearer the securing point $c_1$ and $c_2$ are together. In the limiting case $c_1$ and $c_2$ may coincide or the spring may be jointed to the frame about a central longitudinal axis.

On account of the arrangement of the springs $e$ also near to the central longitudinal plane the actions of the springs $c$ and $e$ are oppositely directed and thus produce a diminished bending stress on the frame.

In case the spring $c$ is broken, the arrangement has the further advantage that the wheel is guided even after the breakage by the jointed quadrilateral $h$, $d$, $m$, $o$, the shock being taken up by the spring $e$ and sudden settling on the stop $s$ being avoided.

The springing may be equally distributed over the leaf spring and the link member springs. The arrangement may, however, also be such that the main part of the springing is taken by either the leaf spring or the link member springs. In the first case it is possible to relieve the frame of twisting forces in a very simple and effective manner while in the latter case the relieving of the leaf spring is especially great.

The arrangement can be employed in a similar manner with leaf springs and link members swinging in the longitudinal plane. Further, the invention can be used on driven or non-driven front or rear axles.

As shown in Fig. 3 the lever $f$ is carried in the bearing $d$ by means of a hollow bolt $v$ pivoting in bushings $w$ of the socket $d$. The bolt is non-rotatably secured to the lever $f$ by means of a key $y$.

In order to allow an oblique position of the lever with respect to the bearing $d$ and the frame, ball-shaped bearings can be provided.

What I claim is:

1. In a power-driven vehicle a frame, a vehicle wheel, a fork-like stub axle carrying the wheel, a steering swivel, mounted in the fork-like extensions of the stub axle, two guiding elements attached at one end to the frame and at the other end to the steering swivel, said guiding elements forming with the stub axle and the frame a quadrilateral guiding system for the wheel, an additional link member which is pivoted at one end to the frame in such a manner that it swings substantially parallel to the guiding elements, a joint piece mounted between the fork-like extensions of the stub axle on the steering swivel, to which the additional link member is pivotally connected.

2. In a power-driven vehicle a frame, a vehicle wheel, a stub axle carrying the wheel, a steering swivel in the stub axle, a link member pivotally connected to the frame, a ball joint, by means of which the link member is connected to the steering swivel, a leaf spring connected to the frame, a joint piece arranged on the steering swivel, said joint piece having a spring supporting bolt thereon extending transversely with respect to the leaf spring for pivotally connecting the end of the leaf spring to the steering swivel, so as to permit of relative angular motion between the end of the leaf spring and the stub axle only about the axis of the steering swivel and about a horizontal axis perpendicular to the plane in which the leaf spring swings.

3. In a power-driven vehicle, a frame, a vehicle wheel, a stub axle carrier carrying the wheel, a leaf spring fixed at one end to the frame and connected at the other end to the stub axle carrier, a link member pivoted at one end to the frame and at the other end to the stub axle carrier, said leaf spring and link member guiding the wheel relatively to the frame in such a manner that the wheel swings in a vertical plane and an additional spring bearing at one end against the frame and at the other end against the link member.

4. In a power-driven vehicle, the combination as set forth in claim 3, in which the additional spring is a substantially unguided frictionless helical spring.

5. In a power-driven vehicle, the combination as set forth in claim 3, in which the link member is a two-armed lever and the additional spring bears against the arm of the lever remote from the point of connection of the lever to the stub axle carrier.

6. In a power-driven vehicle, a frame, a vehicle wheel, a stub axle carrier carrying the wheel, two guiding elements for the wheel, of which at least one is a leaf spring, each of said guiding elements positively connected at one end to the frame and connected directly at the other end to the stub axle carrier, so as to guide the stub axle carrier with respect to the frame in the manner of a jointed parallelogram, an additional link member pivoted at one end to the frame and at the other end to the stub axle carrier, and a shock damper operatively connected to the additional link member for actuation by the additional link member.

7. In a power-driven vehicle, a frame, a vehicle wheel, a stub axle carrier carrying the wheel, a leaf spring and a link member each connected at one end to the frame and at the other end to the stub axle carrier, so as to guide the stub axle carrier with respect to the frame in the manner of a jointed parallelogram, an additional link member pivoted at one end to the frame and at the other end to the stub axle carrier, and an additional spring for supporting said first-mentioned link member against the frame, said link members forming with the frame and the stub axle carrier a jointed quadrilateral structure, so that in the case of fracture of the leaf spring the link members co-operate to guide the stub axle carrier with respect to the frame and the additional spring provides the springing for the wheel.

8. In a power-driven vehicle, a frame, a vehicle wheel, a stub axle carrier carrying the wheel, a leaf spring and a link member each connected at one end to the frame and at the other end to the stub axle carrier, so as to guide the stub axle carrier with respect to the frame in the manner of a jointed parallelogram, an additional link member pivoted at one end to the frame and at the other end to the stub axle carrier, one of the pivotal connections of the additional link member having a certain amount of play in the longitudinal and transverse directions, and an additional spring for supporting said first-mentioned link member against the frame, said link members forming with the frame and the stub axle carrier a jointed quadrilateral structure, so that in the case of fracture of the leaf spring the link members co-operate to guide the stub axle carrier with respect to the frame and the additional spring provides the springing for the wheel.

9. In a power-driven vehicle, the combination as set forth in claim 7, with an elastic abutment for limiting the deflection of the additional spring, so that in the event of fracture of the leaf spring, a sudden excessive swinging movement of the link member is prevented.

10. In a power-driven vehicle, a frame, a vehicle wheel, a stub axle carrier carrying the wheel, a leaf spring secured at one end to the frame and connected at the other end to the stub axle carrier, a link member connected at one end to the frame and at the other end to the stub axle carrier, the said leaf spring and link member guiding the stub axle carrier positively relatively to the frame in a vertical plane and a second spring not serving for guiding the stub axle carrier, said second spring operatively connected to the stub axle carrier and the frame in parallel with the said leaf spring and supporting the wheel resiliently with respect to the frame.

11. In a power-driven vehicle, a frame, a vehicle wheel, a stub axle carrying the wheel, a steering swivel in the stub axle, two guiding elements for the wheel, of which at least one is a leaf spring, said guiding elements being positively attached at one end to the frame and connected directly at the other end to the steering swivel so as to form with the stub axle and the frame a quadrilateral guiding system for the wheel, an additional link pivoted at one end to the frame and a pivot joint for connecting the additional link member to the steering swivel so that the additional link member swings substantially parallel to said guiding elements.

12. In a power-driven vehicle, a frame, a vehicle wheel, a stub axle structure comprising a stub axle carrying the wheel and a steering swivel in the stub axle, two guiding elements for the wheel, said guiding elements being positively attached at one end to the frame and connected directly at the other end to the stub axle structure so as to form with the stub axle structure and the frame a quadrilateral guiding system for the wheel, an additional link pivoted at one end to the frame and a pivot joint for connecting the additional link member to the steering swivel so that the additional link member swings substantially parallel to said guiding elements.

MAX WAGNER.